Oct. 7, 1924.

C. McG. SYKES 1,511,178

AUTOMATIC WEIGHT INDICATING MECHANISM

Filed Oct. 31, 1922    2 Sheets-Sheet 1

Inventor:—
Cameron McGregor Sykes
By:- George E. Folkes
Attorney.

Oct. 7, 1924.

C. McG. SYKES 1,511,178

AUTOMATIC WEIGHT INDICATING MECHANISM

Filed Oct. 31, 1922     2 Sheets-Sheet 2

Inventor:—
Cameron McGregor Sykes.
By:— George E. Folkes.
Attorney.

Patented Oct. 7, 1924.

UNITED STATES PATENT OFFICE.

CAMERON McGREGOR SYKES, OF BIRMINGHAM, ENGLAND, ASSIGNOR TO W. & T. AVERY, LIMITED, OF BIRMINGHAM, ENGLAND.

AUTOMATIC WEIGHT-INDICATING MECHANISM.

Application filed October 31, 1922. Serial No. 598,221.

*To all whom it may concern:*

Be it known that CAMERON MCGREGOR SYKES, a subject of the King of Great Britain, residing at Soho Foundry, Birmingham, England, has invented a new and useful Improvement Connected with Automatic Weight-Indicating Mechanism; and he does hereby declare the following to be a full, clear, and exact description of the same.

This invention has reference to improvements connected with automatic weight indicating mechanism, and has particular reference to indicating mechanism of the kind which embodies a drum indicator which is adapted to revolve about a vertical axis in a horizontal plane.

The primary object of the present invention is to increase the sensitiveness of weight indicating mechanism of this character by substantially eliminating or reducing the friction obtaining at the lower bearing of the vertical spindle due to the weight of the mechanism mounted on the said spindle. The invention further resides in the means for transmitting motion to the said drum indicator.

A further object of the present invention is to maintain the weight indicator at its correct zero or point of no load indication irrespective of the level of the apparatus. A number of devices are in use for effecting a similar object in conjunction with other types of pendulous weight indicating mechanisms. The present invention differs fundamentally from the known means for effecting the aforesaid object in that in the known constructions one pendulum is so connected to another or counterbalancing pendulum that the angular motion of one pendulum due to an inclination in the level of the machine is counterbalanced by an equal and opposite angular motion of the other pendulum of the pair, whereas in the present invention we employ one pendulum of the pair to add an equal amount of load or pull to a connecting rod to that which is removed by the other pendulum of the pair due to the aforesaid inclination or out of level setting of the scale, and this motion of the pendulums is not transmitted to the indicating mechanism.

The present invention consists of improvements connected with automatic weight indicating mechanism of the kind which embodies a drum mounted on a vertical spindle and adapted to rotate in a horizontal plane, characterized by the provision of a float on the said spindle, the float being mounted in a liquid containing receptacle in such a manner that the weight of the indicating mechanism is wholly or substantially offset by the upward force imparted to the float by the liquid. A further feature of the invention consists in rotating the drum indicator in either direction by means of oppositely wound flexible ribbons (preferably metallic), the outer ends of these ribbons being mounted upon cam faces which form part of a duplex pendulous weighing resistant, the load being transmitted to the said pendulums by means of other flexible ribbons which have connection to the bottom work of the scale in such a manner that any motion of the pendulums is transmitted through the aforesaid oppositely wound flexible ribbons to the drum indicator.

The present invention also consists of the employment in connection with pendulous weighing mechanism more particularly of the kind hereinbefore referred to, of a pair of pendulous resistance weights which are adapted to automatically offset the load of the scale or a part thereof, both of the said pendulous weights being connected to a common connecting rod which rod is overloaded to the total weighing capacity of the scale so that the rod is always maintained in tension, one of the pendulums being operatively connected to the horizontal drum weight indicating device, the arrangement being that any alteration in the level of the scale results in the one pendulous weight of the pair adding or removing an equal and opposite amount of weight to the said overweighted connecting rod to that removed or added by the other pendulum of the pair, and the motion of the pendulums is not transmitted to the weight indicating mechanism.

The present invention will now be described with reference to the accompanying sheet of drawings wherein similar reference numerals indicate similar parts in the different views.

The invention is illustrated by its application to a weight indicator for weighbridges or platform weighing machines, and only that much of the mechanism is illustrated as is necessary to an understanding of the features of the present invention.

In the drawings:—

Figure 1:
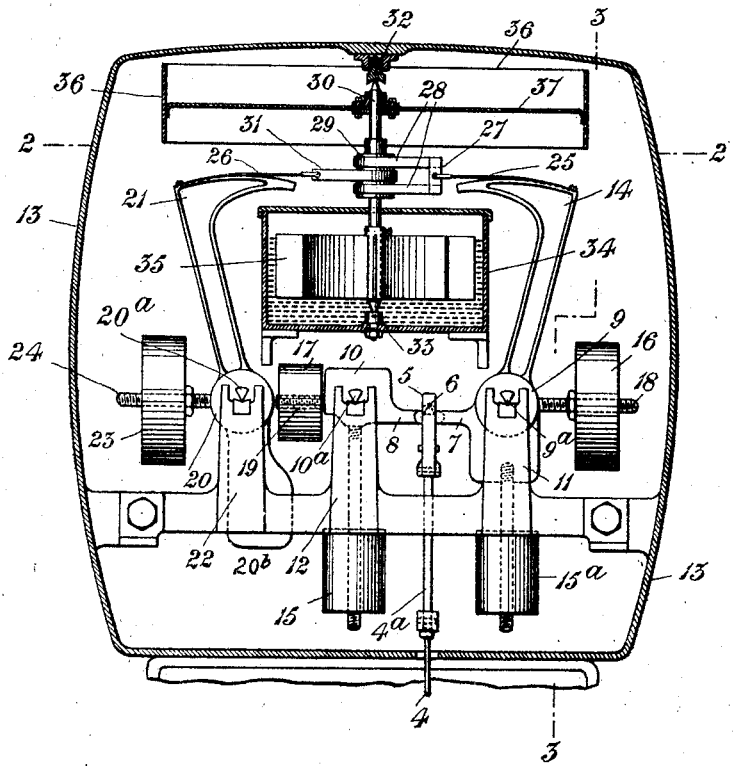
Fig. 1 is a part sectional front elevation of the indicator mechanism.
Figure 2:
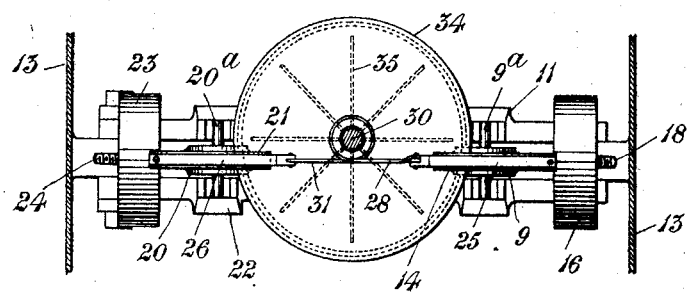
Fig. 2 is a sectional plan on line 2—2 of Fig. 1.
Figure 3:
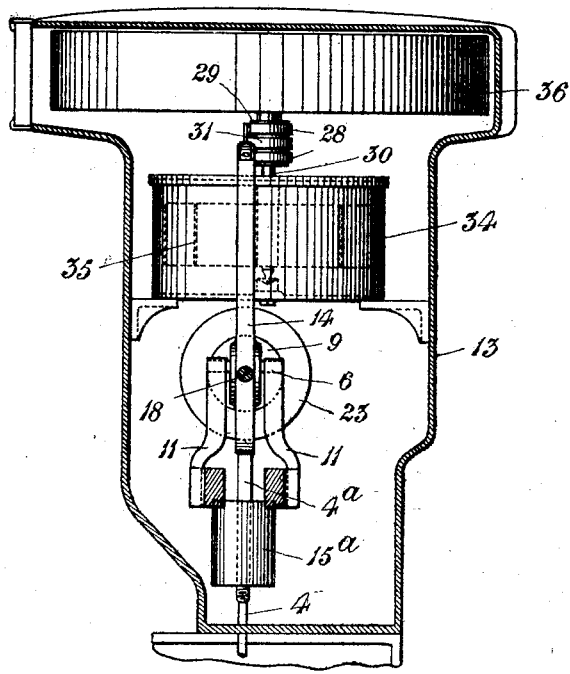
Fig. 3 is a part sectional side elevation on line 3—3 of Fig. 1.

The load is transmitted from the weighing platform through a lever system in the ordinary manner to a connecting rod 4 pivotally connected at its upper end to a yoke which is connected to the lower ends of three flexible ribbons $4^a$ each are provided at their upper end with a bearing shackle 5 suspended from three aligned knife-edges 6 each separately mounted upon adjacent overlapping arms 7 and 8 respectively of the pendulous weighted members 9 and 10. The arms 7 are forked and disposed on either side of the arm 8. These pendulous weighted members are separately mounted by means of the knife-edges $9^a$ and $10^a$ respectively upon bearing brackets 11 and 12 which are secured to the scale housing 13. The weighted member 9 is provided with an upwardly projecting arm having a segment 14 at its upper extremity and both of the members 9 and 10 are provided with pendulous weights $15^a$ and 15 respectively adapted to wholly or partially counterbalance the load applied to the weighing platform, the two pendulums moving in opposed directions under the action of the load transmitted from the weighing platform through the connecting rod. The pendulum 15 is adapted to have an equal and opposite effect to that of the pendulum $15^a$ for the purpose of maintaining the true zero or setting of the drum indicator as will be hereinafter explained. The weights 16 and 17 respectively which are mounted on screwed extensions 18 and 19 connected to the weighted members 9 and 10 respectively, serve to accurately balance each member about its knife-edge $9^a$ and $10^a$ respectively. In addition to the weighted member 9 another member 20 is provided having a segmental arm 21 corresponding to the segmental arm 14 of the member 9, this member 20 is mounted by means of the knife-edge $20^a$ upon the bracket 22 also secured to the scale housing 13 and is provided below the knife-edge with a counterbalancing mass $20^b$ to balance the weight of the arm 21. This member is provided with a balance weight 23 which is mounted upon the screwed rod 24 in a similar manner and for the same purpose as that already described with reference to the members 9 and 10. This member 20 forms no part of the weighing resistance of the scale mechanism but is employed as a means for obtaining the desired rotation of the spindle of the horizontal drum indicator. Secured at one end to the peripheries of the segmental faces of the arms 14 and 21 respectively are substantially horizontally disposed flexible metallic ribbons 25 and 26, the ribbon 25 being connected at its other end by means of a vertical yoke 27 to two flexible metallic ribbons 28 disposed at right angles to the ribbons 25, the ribbons 28 are wound around the cylinder 29 formed on the spindle 30 of the horizontal drum indicator. The flexible ribbon 26 is connected at its free end to another flexible ribbon 31 which is disposed in a plane at right angles to that of the ribbon 26 and this ribbon 31 is wound around and connected at its other end to the cylinder 29, the ribbon 31 being wound in the opposite direction to the two ribbons 28. The vertical spindle 30 is pointed at each end and the points have bearings within conical or cupped recesses 32 and 33, the bearing 32 being adjustably mounted in the top of the scale housing 13 and the bearing 33 being mounted in the base of the float chamber 34. Mounted on the spindle 30 is a float 35 which may take the form of a wooden paddle or cup disposed around the said spindle and rotatable therewith. This float is located within the float chamber 34 which contains a liquid such as water or oil. Also mounted on the vertical spindle 30 is the horizontal drum indicator 36 which is formed on a ribbed skeleton framing 37 in known manner, the drum indicator being so mounted on the vertical spindle 30 that any weight which it and the cylinder 29 transmit to the vertical spindle is wholly or substantially offset or counterbalanced by the upward force which is exerted on the spindle due to the partial immersion of the float within the liquid in the float chamber. By this means the pressure and consequently the friction obtaining between the lower pointed end of the vertical spindle 30 and its bearing 33 is substantially eliminated or reduced to a minimum with the result that the very smallest addition or removal of a load to the weighing platform results in an accurate indication thereof upon the drum indicator, and a considerable increase in the degree of sensitivity of the indication. The blades of the paddle 35 serve to damp down any excessive motion of the drum indicator 36, as the blades displace the liquid within the chamber and create a resistance to an excessive speed of rotation.

Figure 4:
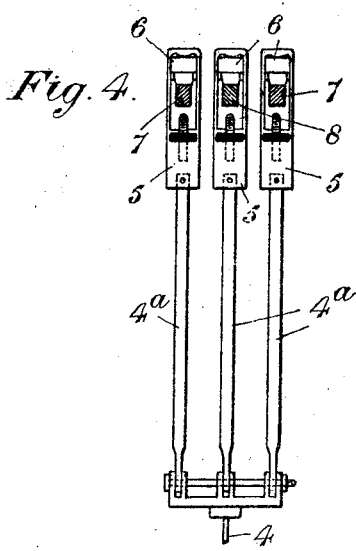
Fig. 4 is an elevation showing the means of suspending the connecting rod from the pendulous levers.

The mechanism already referred to for automatically correcting the zero point of the drum indicator in the event of any disturbance in the level of the apparatus consists of the two opposed pendulous members 9 and 10 to both of which the load transmitted to the connecting rod 4 is equally applied. Upon a load being applied to the rod 4 the member 9 is rocked in an anti-clockwise direction thereby allowing the pair of ribbons 28 in connection with said member through the yoke 27 and ribbon 25 to wind round the cylinder 29. The rotation of the spindle 30 necessary to effect this winding is obtained by the pull of the ribbon 31 connected to the ribbon 26 secured to the member 20 which also rocks in an anti-clockwise direction under the influence of the weight 23. When the load is removed the mechanism is automatically returned to its initial position by the members 9 and 20 moving in a clockwise direction. The counterbalancing member 10 is provided in connection with the weight resistant member 9 and operated therewith. The connecting rod is suspended from the overlapping forked arms 7 and the arm 8 of the members 9 and 10 as seen in Figure 4, in such a manner that a division of any load transmitted through the connecting rod into two takes place, that is, one half to each member. The connecting rod is preferably overweighted in a manner well known in connection with weighing apparatus so as to always maintain it in tension and the pendulous weights 15 and $15^a$ act against this overweight. If the level of the scale housing is altered the effect is that the pendulums 15 and $15^a$ rock as a pair both in the same direction, that is, they both swing to the right or left of their normal vertical position with the result that the one pendulum adds an equal amount of weight or tension to the connecting rod 4 to that which is removed by the other pendulous weight. By this means any alteration in the level of the scale housing does not affect the weight indicator which is of vital importance in sensitive weight indicating mechanism of this character.

Any suitable known form of shock eliminating or vibration damping device may be employed in conjunction with this mechanism, and it is desirable that the connecting rod 4 should be provided with a lost motion device (such as a pin and slot) to prevent any sudden accession or removal of the weight to or from the scale reaching the indicating mechanism, such means being well known in the art and not requiring detailed description.

I claim:—

1. An automatic weight indicating mechanism embodying a rotary indicator having weight numerals on its periphery, a vertical spindle on which said indicator is mounted, means for effecting a two-way motion of said spindle, pendulous resistant members to which said means are connected, a float chamber and a float mounted on said spindle and contained within liquid in said float chamber for the purpose herein set forth.

2. An automatic weight indicating mechanism embodying a rotary indicator having weight numerals on its periphery, a vertical spindle on which said indicator is mounted, oppositely wound flexible ribbons connected to the said spindle, pendulous resistant members to which said ribbons are connected, a float chamber and a float mounted on said spindle and contained within liquid in said float chamber for the purpose herein set forth.

3. An automatic weight indicating mechanism embodying a rotary indicator having weight numerals on its periphery, a vertical spindle on which said indicator is mounted, oppositely wound flexible ribbons connected to the said spindle, pendulous resistant members to which said ribbons are connected, a float chamber, a float mounted on said spindle and contained within liquid in said float chamber, and two pendulous members to both of which the load is equally transmitted the pendulums rocking as a pair both in the same direction in the event of any disturbance in the level of the scale for the purpose herein set forth.

4. An automatic weight indicating mechanism comprising a rotatable drum indicator, a vertical spindle on which said drum indicator is mounted, oppositely wound flexible ribbons connected at their inner ends to the said spindle, pendulously weighted segmental members to which the outer ends of the said ribbons are connected, a float mounted on said spindle, a liquid containing receptacle surrounding said float, and a pendulous resistant member adapted to receive part of the load transmitted to the indicating mechanism said additional pendulous member preventing any alteration in the zero indication of the indicator in the event of any disturbance of the scale level.

In testimony whereof, I have signed my name to this specification.

CAMERON McGREGOR SYKES.